Nov. 19, 1968  S. O. JONES ET AL  3,412,326
PROBE FOR SENSING MOISTURE INCLUDING A HEATING ELEMENT
Filed Dec. 13, 1965

INVENTORS:
HERBERT M. JOHNSON
SAMUEL O. JONES
BY
*Head & Johnson*
ATTORNEYS

United States Patent Office 3,412,326
Patented Nov. 19, 1968

3,412,326
PROBE FOR SENSING MOISTURE INCLUDING
A HEATING ELEMENT
Samuel O. Jones and Herbert M. Johnson, Tulsa, Okla.,
assignors to Nelson Electric Company, Tulsa, Okla., a
corporation of Delaware
Filed Dec. 13, 1965, Ser. No. 513,434
7 Claims. (Cl. 324—65)

This invention relates to a probe for sensing moisture. More particularly, the invention relates to a probe for sensing moisture on a surface under varying ambient temperature conditions.

This invention pertains to a moisture detecting probe particularly adapted for use as a part of a snow melter control system and for purposes of exemplification will be described in this connection. There has long been a need for means for detecting the presence of moisture, in the form of rain, sleet or snow, on surfaces which present a hazard under freezing conditions. For example, the occurrence of sleet or snow on bridges, parking lots, airport runways, sidewalks and so forth always presents a dangerous condition. A common practice has been to install heating cables in the concrete making up such surfaces. When frozen moisture conditions exist, the heating cables can be switched on, raising the temperature of the surface to melt the accumulated moisture and prevent unsafe conditions from arising. A problem has existed in providing the necessary controls for automatically switching on and off the heating cables. Two conditions must exist before heating cables embedded in a surface to be protected need to be switched on. That is, there must be the presence of moisture in some form, whether sleet, rain or snow, combined with freezing temperatures. The temperature may be detected in the surface itself or in the air above the surface. While the detection of temperature is relatively simple, a difficult problem has existed in detecting the existence of moisture. It is the principal object of this invention to provide an improved moisture probe adaptable as an example of its application for use in a system to switch on and off heating cables or other similar devices.

Another object of this invention is to provide a probe for sensing moisture under various ambient temperature conditions.

Another object of this invention is to provide a moisture probe adaptable to be embedded in a surface, the probe being characterized by being substantially indestructible and capable of bearing the weight of any pedestrian or vehicular traffic to which it may be exposed.

These particular objects and other objects of the invention will be understood with reference to the following description and claims taken in conjunction with the attached drawings in which:

Figure 1:
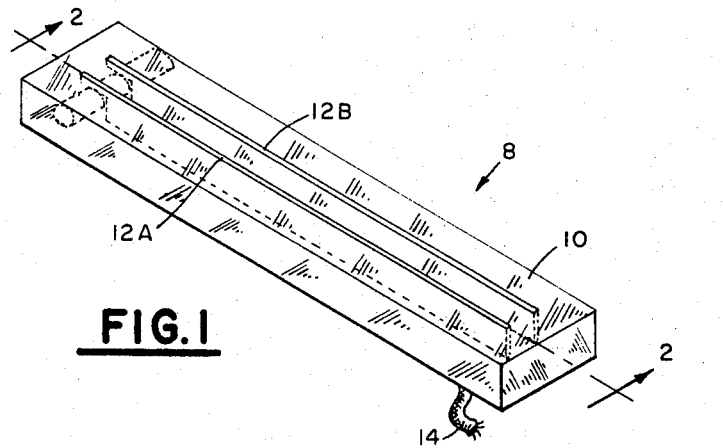
FIGURE 1 is an external isometric view of the moisture probe of this invention.

Referring to FIGURE 1, an exterior view of a probe exemplifying the principles of this invention is shown. The probe consists basically of a body portion 10 which is of non-conductive material having relatively high strength. One example of the material of which body 10 may be formed is epoxy resin. Embedded in the body 10 are two spaced apart elongated conductive elements 12A and 12B. These may be formed of any conductive material but preferably they are of brass or stainless steel, these materials being preferred since they are conductive and do not deteriorate when exposed to air and moisture and have relatively high wear resistance. Any conductive material, however, can be used to form the conductive elements 12A and 12B within the purview of this invention, the material being selected according to the particular application to which the invention is applied. Extending from the body portion 10 is a multi-conductor cable 14.

Figure 2:
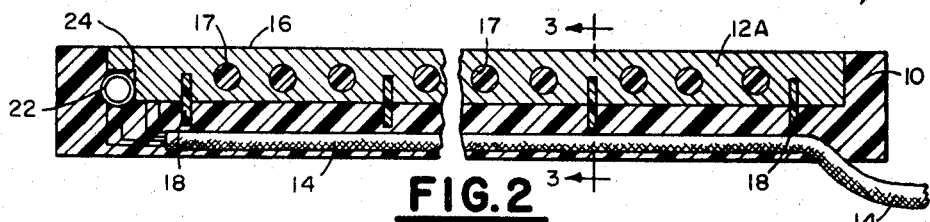
FIGURE 2 is a longitudinal cross-sectional view taken along the line 2—2 of FIGURE 1.
Figure 3:
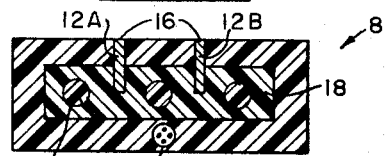
FIGURE 3 is a cross-sectional view taken along the line 3—3 of FIGURE 2.

FIGURE 2 is a longitudinal cross-sectional view taken through one of the conductive elements 12A. The form of the conductive elements 12A and 12B may vary, however, in the illustrated arrangement. Each of the elements is in the form of a rectangularly elongated bar embedded so that one longitudinal edge 16 forms a part of the upper surface of the body 10. Conductive elements 12A and 12B are illustrated as including openings 18 so that the plastic material forming the body 10 may flow therethrough providing increased strength to the overall structure. The conductive elements 12A and 12B are supported in spaced paralleled arrangement by insulating spacers 18 which likewise include openings 20 so that the body portion is integrally reinforced.

Supported within the body 10 adjacent one end of the conductive elements 12A and 12B is a heating element 22 which may be in the form of a resistor. The function of heating element 22 will be described subsequently. As shown in FIGURE 2, the conductive elements 12A and 12B may be notched at 24 so that a portion of each of the conductive elements extends directly over the heating element 22. The conductive elements 12A and 12B and heating element 22 are electrically insulated from each other and each are connected to conductors carried by cable 14.

OPERATION

The operation of the moisture sensing probe will be described with reference to FIGURE 4, a simplified circuit diagram showing an application of the invention. Basically, the invention detects moisture by the resistance measured between conductive elements 12A and 12B. The detection of moisture at temperature above freezing is relatively simply accomplished since it is well known that in the presence of moisture, resistance between conductive elements will vary. However, the problem solved by this invention is a means of detecting moisture on a surface at all possible ambient temperatures. This is achieved by means of the combination of heater 22 positioned at one end of the elongated, spaced conductive elements 12A and 12B. Heater 22 is continuously energized when the probe is in operation so that one end of the conductive elements 12A and 12B is always maintained at above freezing temperature, regardless of the ambient temperature. Thus, if any moisture in any form, including sleet and snow, is present upon the surface of the probe, some portion of such moisture will be melted and maintained in liquid form, thereby affecting the resistance between conductive elements 12A and 12B.

The use of a heater to raise the temperature of resistance detecting members to detect moisture is again not within itself new. The novelty of this invention is the provision of an arrangement wherein the heating element is placed at one end of elongated spaced conductive elements. The length of the conductive elements is variable but, according to the invention, must be such that with heater 22 energized, one end is always maintained above freezing temperature regardless of the ambient temperature, and the other is sufficiently spaced from the heater to be always substantially at the temperature of the surface in which the probe is positioned. When moisture, such as in the form of snow or sleet, falls upon the probe, a portion will be melted by heat in the area adjacent the heating element 22, forming liquid moisture which reduces the resistance between the conductive elements. This provides an indication of the presence of moisture. After a length of time the moisture in the immediate vicinity of the heating element 22 may be evaporated by the heat. In this invention, however, a portion of the conductive elements is spaced at a sufficient distance from the heating element as to be exemplary of the temperature of the surface in which the probe is positioned. If moisture exists upon such surface, it will not be evaporated by the heating element 22 in all areas of the probe. If moisture is upon the probe, including moisture in the form of snow or sleet, somewhere between the end at which heating element 22 is positioned and the opposite end there will be a point at which the moisture will be melted to liquid form providing decreased resistance between the conductive elements.

Figure 4:
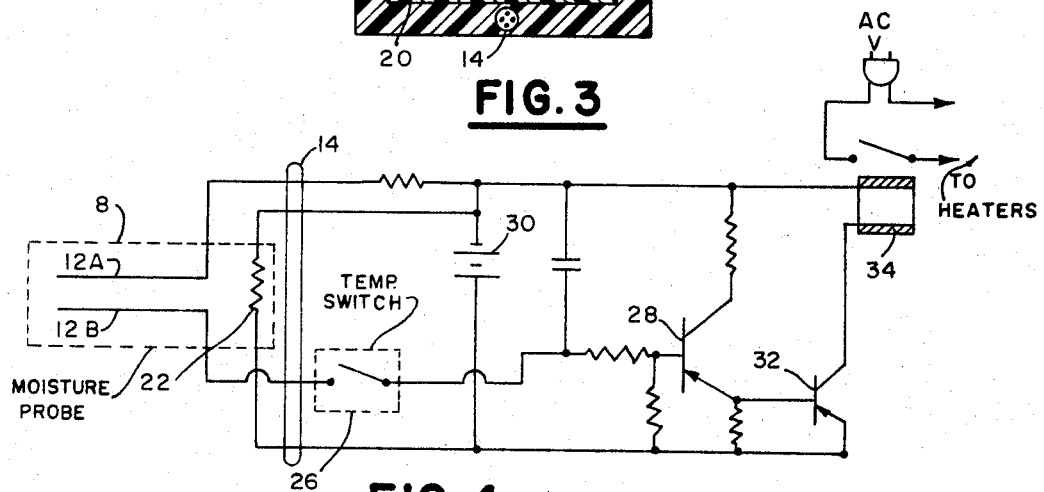
FIGURE 4 is a simplified schematic diagram illustrating an application of the moisture probe of this invention.

FIGURE 4 illustrates the use of the probe of this invention in a simplified snow melter control system. Conductive elements 12A and 12B are positioned in series with a temperature switch which is typically responsive to the surface in which the moisture probe is positioned. The conductive elements 12A and 12B normally present a very high resistance; however, when moisture is present upon the surface of the probe the resistance will fall to less than five megohms. Through the temperature switch 26 the resistivity of the probe is connected to a first transistor 28 energized by a voltage source 30. When the resistance between conductive elements 12A and 12B falls to less than five megohms, transistor 28 receives enough forward bias to go into conduction. As the transistor 28 conducts, it presents a low impedance forward bias to a second transistor 32, switching the transistor on. In series with the second transistor 32 is a relay 34 which, when energized, supplies power to heating cables or the like. The circuit of FIGURE 4 is merely illustrative of an application of the probe of this invention. Temperature switch 26 may be responsive to the temperature of the surface in which the probe is positioned or it may be responsive to the air temperature of the surface in which the probe is positioned. An improved arrangement includes the use of an air temperature and ground temperature switch in parallel with each other so the heating cables are turned on when either the air temperature or the surface temperature falls below freezing in the presence of moisture as detected by the moisture probe.

The probe of this invention is simple and substantially indestructible. The only requirement for continued use is that the surface be kept clean of oil or tar. The surface may be cleaned with soap or chemical cleaners or may be occasionally buffed as required.

The preferred embodiment is substantially as illustrated. Conductive elements 12A and 12B are preferably elongated, straight and parallel. However, such physical arrangement is only the preferred embodiment and is not a limitation of the invention. The conductive elements do not have to be parallel to each other nor does the heating element have to be placed at one end; however, according to the principles of this invention, the heating element must be positioned so that at least a portion of the conductive elements is maintained above freezing temperature and another portion of the conductive elements is sufficiently spaced from the heater as to be substantially at the temperature of the surface in which the probe is placed.

While the invention has been described with a certain degree of particularity, it is manifest that many changes may be made in the details of construction and the arrangement of components without departing from the spirit and scope of this disclosure.

What is claimed:

1. A probe for sensing moisture under varying ambient temperature conditions comprising:
   a heating element having means of maintaining a temperature above the freezing point for the ambient temperature to which the probe is subjected; and
   a pair of spaced apart conductive elements each having one exposed moisture sensing surface, said spaced conductive elements having portions of said surface adjacent said heating element whereby the temperature thereof is maintained above the freezing point for the ambient temperature to which the probe is subjected and said spaced conductive elements having further portions of said surface extending at a substantial distance from said heating element whereby the temperature thereof is substantially at the ambient temperature.

2. A probe for sensing moisture according to claim 1 including means of detecting the resistance between said spaced conductive elements.

3. A probe for sensing moisture according to claim 1 wherein said spaced conductive elements are paralleled and substantially straight and wherein said heating element is positioned adjacent one end thereof.

4. A probe for sensing moisture according to claim 1 wherein said heating element and said spaced conductive members are supported in a body, each of said conductive elements having said exposed surface forming a portion of one surface of said body.

5. A probe for sensing moisture according to claim 4 wherein said body is formed of molded epoxy resin having said spaced conductive elements and said heating element embodied therein.

6. A probe for sensing moisture according to claim 1 wherein said heating element includes a resistor having voltage connected thereto.

7. A probe for sensing moisture according to claim 1 wherein each of said spaced conductive elements is a metal bar.

References Cited

UNITED STATES PATENTS 2,717,957   9/1955   Ohlheiser _____ 328—1

RUDOLPH V. ROLINEC, *Primary Examiner.*

E. E. KUBASIEWICZ, *Assistant Examiner.*